Nov. 8, 1966  F. MÜLLER ET AL  3,284,037
PIPE SUSPENSION MEANS
Filed Nov. 12, 1965
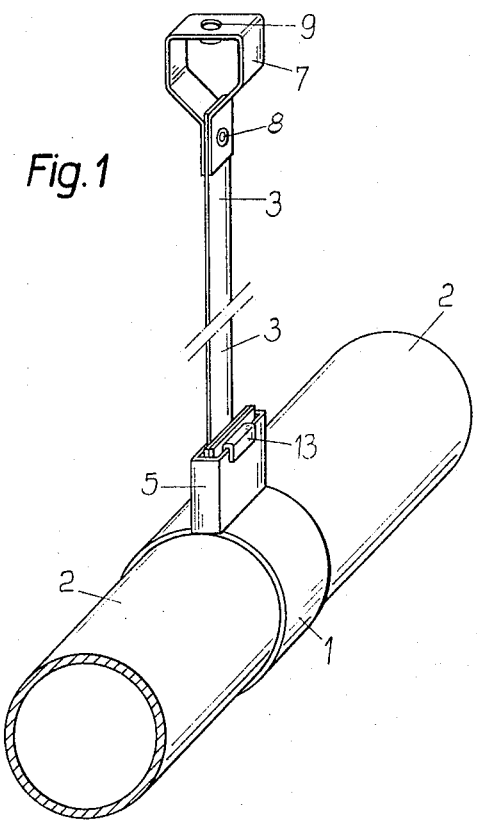
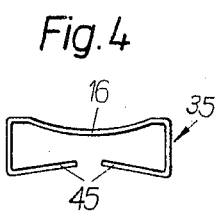
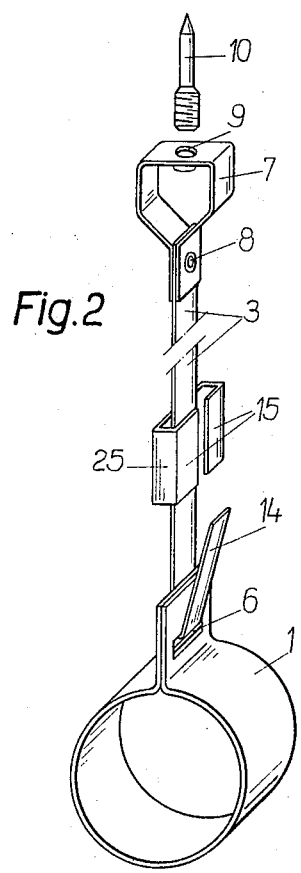
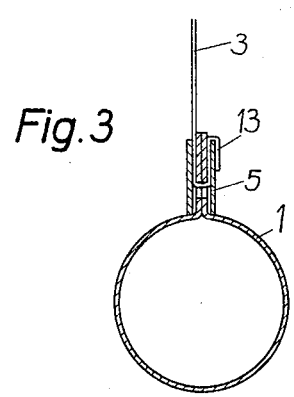
Inventors
FRANZ MÜLLER
HELMUT MÜLLER
BY H. Gibner Lehmann
AGENT

3,284,037
PIPE SUSPENSION MEANS
Franz Müller and Helmut Müller, both of Konigsteiner Strasse 132, Frankfurt-Unterliederbach, Germany
Filed Nov. 12, 1965, Ser. No. 507,285
Claims priority, application Germany, Nov. 18, 1964, M 63,164
6 Claims. (Cl. 248—62)

This invention relates to a pipe suspension means having a suspension band for infinitely variable or sensitive adjustment of the suspension height to various adjustments.

Pipe-suspension means are known which comprise a perforated suspension band which is connected by screws or inwardly bent tongues to a separate clip embracing the pipe. Pipe suspension means of this type however permit adjustment of the suspension height only by stages. In the case of pipe suspension means for infinitely variable or sensitive adjustment of the suspension height it is known for the suspension band to be fastened at its top end to a carrier member, intended for securing to the ceiling or the like, and to be bent over at its bottom end, laid around the pipe to be supported, and secured in relation to said pipe or the like by means of a holding member. In the case of the pipe suspension means of this type which are provided with a perforated suspension band, said holding member is often formed by a bolt or clamping means extending through two holes in the band. In other types of pipe suspension means, which may also use an unperforated suspension band, said holding member is constructed as a stool which is placed on the upper side of the pipe to be supported and through the interior of which the suspension band coming from above and the end of the band coming from below extend. The end of the band is folded over an edge formed on the top of the stool and is intended to hold the band fast under the load of the tube. In all these pipe suspension means, whether they are provided with a perforated band and a bolt or clamping means or whether they are provided with a holding stool, the holding band extending around the pipe transmits the entire load of the latter to a very narrow fastening point, whether this is the bolt or the clamping means or the point where the band is bent around the upper edge of the stool. In order to obtain the necessary safety, the suspension band must therefore be considerably over-dimensioned, whereby its cost is increased and above all it can be manipulated only with difficulty and, in the case of inaccessible positions, only very badly.

Pipe suspension means are also already known in which the suspension band engages, in the form of a closed loop, at the top around a carrier to be fastened on or in the ceiling and at the bottom around the pipe, said loop being closed and tightened by a special tightening device. Suspension devices of this type however are too expensive for the purpose in question and are also too bulky for the fitting of pipe insulations and the like. Moreover, they are extremely liable to soiling and to attack by corrosion, particularly in the tightening device.

Finally, a pipe suspension means is known in which a holder which widens in the direction of the pipe is fastened to the ceiling or the like. The suspension band is laid around the pipe itself and then clamped fast to the holder at both ends by means of a clamp ring. For pipe suspension means of this type special holding members are required which excessively increase the cost of the suspension device. Above all however it is possible only with special skill to clamp the two band ends uniformly to the holder. The fitting of pipe suspension devices of this type is practically impossible in difficult accessible positions.

In contrast thereto the aim of the invention is to provide a pipe suspension device which is very inexpensive to manufacture, which can be fitted particularly simply and easily, and which insures particularly reliable suspension and accuracy of suspension, with a secure, firm seating of the clip on the pipe.

According to the invention this is achieved by providing a clip band which is separate from the suspension band and which firmly embraces the pipe or the like by the drawing together of its ends which extend radially outward in the form of flanges, said clip band having a carrier portion, which extends upward and is provided with a slot, and side bearing surfaces above the slot as holder for the suspension band, while the latter is guided through said slot, bent over, and clamped by a clamp ring on said bearing surfaces of the carrier portion of the clip band, the clamp ring extending downward beyond the slot and beyond the point at which the suspension band is bent over and being supported by its bottom edge on the annular portion of the clip band.

Through the separation of the clip and the suspension band, in the form of two separate members, the effect is achieved that the clip band absorbs all variations of cross-section of the pipe which occur through temperature fluctuations or the like, without transmitting any detrimental influence to the suspension band. The clip band can, moreover, be very accurately and firmly mounted on the pipe and thus secures the latter against sliding or twisting. The pipe suspension means according to the invention can be mounted particularly easily, simply, and with great accuracy. In the construction of large plants it also permits subsequent adjustment of the suspension height in a very simple manner.

Further features and advantages of the invention will be clear from the following description of one example of its performance, with reference to the drawing in which:

FIG. 1 shows a pipe and a mounted pipe suspension means according to the invention, in perspective;

FIG. 2 is an exploded view of the parts of a slightly modified pipe suspension means according to the invention, in perspective;

FIG. 3 is a vertical central section through the lower portion of the pipe suspension means; and FIG. 4 is a top plan view of a slightly modified clamp ring for a pipe suspension means of the type illustrated in FIGS. 1 to 3.

In the example illustrated the clip band 1, which is shaped with dimensional accuracy, is made of substantially thicker material than the suspension band 3 in order that the pipe 2 may be securely and firmly embraced by the clip band 1. The two ends of the clip band 1 are constructed as flanges, and each is provided with a slot 6. These slots 6 are so disposed that they coincide with one another when the clip is closed.

The two clip ends projecting outward in the form of flanges and used in this embodiment of the invention as a holder for the suspension band 3 provide the particular advantage that after the clip 1 has been placed on the pipe 2 they are constantly urged away from one another. They thus continuously apply a resilient pressure from inside to outside to the suspension band 3 lying on their bearing surfaces, said pressure giving rise to a counterpressure acting from outside to inside in the clamp ring 5. The clamp ring 5 extends in the downward direction over the slots 6 and past the point at which the suspension band 3 is bent over, and is supported by its bottom edges on the annular portion of the clip. In the region of its surfaces making contact with the bearing of the holder of the clip band 1 the suspension band 3 is thus firmly gripped and secured against loosening. The clamp ring 5 is preferably so constructed that it can extend to the full extent of its width over the upwardly projecting carrier portion, that is to say the flange-like ends of the clip band 1. The clamp ring 5 is slightly less wide, for example 1–2 millimetres less wide than the height of the upwardly projecting flange portions of the clip band 1. When the clamp ring 5 is placed in position, the flange portions of the clip band 1 thus project slightly above the upper edge of said ring, as illustrated in FIG. 1. Consequently, on the one hand practically the entire surface of contact of the suspension band 3 with the upwardly projecting flange portions of the clip band 1 can be utilized for clamping, while on the other hand the simultaneous termination of the clamp surfaces on both sides in the form of sharp edges, which might easily give rise to the breaking of the suspension band 3, is avoided. In addition, it is possible in this way, as illustrated in FIG. 1, for the last end 13 of the suspension band 3 to be folded downward over the top edge of the clamp ring 5, and thus to give the clamp ring 5 absolute protection against unintentional loosening from the clamp position. The folded-over end 13 of the suspension band 3 is thus supported in the inward direction by the edge portions of the flanges of the clip band 1 which project upward beyond the clamp ring 5. The end 13 of the suspension band 3 is preferably bent downward over the top edge of the clamp ring 5 in those cases where the most rigid possible connection between the suspension band 3 and the clip band 1 is desired, so that even slight creeping of the suspension band 3 in relation to the clip band 1 in the slot 6 is prevented.

At the top end the suspension band 3 is fastened by a pin rivet connection 8 to the carrier 7, which is provided with a screw thread 9. The pin connection 8 enables the suspension band 3 to swivel in its plane in relation to the carrier 7, after the latter has been fastened by its screw thread 9 on a threaded dowel 10 or the like on the ceiling or the like. The suspension band 3 can then without difficulty be adjusted perpendicularly to the axis of the pipe 2 to be suspended, so that it will then pass smoothly and at right angles through the slot 6 in the clip band 1.

In the example illustrated in FIG. 1 the clamp ring 5 is constructed as a closed ring having a flat rectangular cross section. In the example illustrated in FIG. 2 the clamp ring 25 is provided on one of its longer sides with a continuous axial slot, so that it forms a clamp engaging on both sides around the flange portions of the clip band 1 and the suspension band 3 guided through the slot 6 in the latter. The clamp legs 15 may be bent inward to serve as springs. Through the fact that the clamp ring 25 is supported by its bottom edge on the annular portion of the clip band 1, even when it is constructed as an open clip as illustrated in FIG. 2, it provides complete security against unintentional detachment, exactly like the unslotted clamp ring 5 illustrated in FIG. 1. In the example illustrated in FIG. 2 moreover the end of the suspension band 3 can be folded over the clamp arms 15 and the slot provided between the latter.

In the embodiment illustrated in FIG. 4 the clamp ring 35 may also have concave curvature on one longer side and thus apply additional spring force, by which it presses the suspension band 3, passing through the slot 6, against the flange ends of the clip band 1. FIG. 4 shows a clamp ring 35 in which a concave wall 16 is provided, while on the other side two inwardly bent clamp legs 45 are provided.

For the purpose of fitting the pipe suspension means the clip band 1 is first placed around the pipe to be fastened and pressed together at the two flange ends in such a manner that the two slots 6 coincide. After the suspension band 3 has been fastened by its carrier 7 to the ceiling or wall, the suspension band 3 is adjusted at the joint 8 so that it is perpendicular to the axis of the pipe 2 or the like to be fastened. The suspension band 3 is then drawn through the slot 6 in the clip band 1, which has been placed on the pipe or the like, and by means of pliers is bent over, thus pressing together the upwardly projecting clip band flanges. The clamp ring 5 is then drawn from above over the suspension band 3 and the flange portions of the clip band until it rests on the annular portion of the clip band. The slotted clamp ring 25 can be placed subsequently on the suspension band, whereas the non-slotted clamp ring 5 must be previously placed on the suspension band 3 before the latter is passed through the slots 6 in the clip band 1.

After the bottom edge of the clamp ring 5 has been engaged with the annular portion of the clip band 1, the surplus end of the suspension band 3 is cut off, as at 14 in FIG. 2, and the free end 13 (as in FIG. 1) of the suspension band 3 is folded over in the downward direction as desired.

If for example in large installations the suspended pipes have to be readjusted subsequently, the suspension band passing through the slot 6 may in the first instance merely be bent over to form a loop and only lightly held by the clamp ring. After the final adjustment of the pipe system, the suspension band is then finally fastened to the clip band 1 in the manner described above.

We claim:
1. An infinitely variable adjustment pipe suspension comprising, in combination:
  (a) a flexible suspension band,
  (b) means on said band adjacent one end thereof, for fastening the band to an overlying support,
  (c) a clip band adapted to be placed around a pipe, said clip band being in the form of a loop and having end flanges which may be drawn together to cause the clip band to embrace the pipe, at least one of said end flanges having a slot, said flanges being registrable with each other above said pipe,
  (d) said clip band being separate from the suspension band and the clip band flanges having outer bearing surfaces at least one of which is above said slot,
  (e) said suspension band passing through said slot and being bent back through a flat angle to engage an outer bearing surface,
  (f) a clamp ring extending around holding portions of the suspension band which adjoin said bend thereof,
  (g) said clamp ring around said slot of the flange and around the bend of the suspension band,
  (h) the bottom edge of the clamp ring being engageable with the loop of said clip band,
  (i) said clamp ring clamping a holding portion of the suspension band against said bearing surface located above said slot.

2. A pipe suspension means according to claim 1, characterized in that each of the clip band flanges is provided with a slot, said slot registering with one another when the flanges are drawn together and said band passing through both said slots.

3. A pipe suspension means according to claim 2, characterized in that the clamp ring has a width which is substantially the same as the height of the flanges of the clip board.

4. A pipe suspension means according to claim 3, characterized in that the clamp ring is constructed with at least one spring portion which is concave in the peripheral direction and which presses the suspension band against a flange of the clip band.

5. A pipe suspension means according to claim 4, characterized in that the clamp ring has a continuous axial slot and engages at both its end portions the flanges of the clip and the holding portions of the suspension band passing through the slots in said flanges.

6. A pipe suspension means according to claim 5, characterized in that said means for fastening the top end of the suspension band provides for pivotal adjustment in the plane of said suspension clip band.

References Cited by the Examiner

UNITED STATES PATENTS

| | | | |
|---|---|---|---|
| 2,161,782 | 6/1939 | Flower | 248—69 |
| 2,229,129 | 1/1941 | Riegelman | 248—62 |
| 2,289,995 | 7/1942 | Powers | 248—60 |
| 3,236,482 | 2/1966 | Fitzgerald | 248—62 |

CLAUDE A. LE ROY, *Primary Examiner.*